United States Patent
Natu et al.

(10) Patent No.: US 6,721,868 B1
(45) Date of Patent: Apr. 13, 2004

(54) REDIRECTING MEMORY ACCESSES FOR HEADLESS SYSTEMS

(75) Inventors: Mahesh S. Natu, Portland, OR (US); Kerry B. Vander Kamp, Hillsboro, OR (US); Rahul Khanna, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 764 days.

(21) Appl. No.: 09/634,156

(22) Filed: Aug. 9, 2000

(51) Int. Cl.[7] ............................ G06F 12/10; G06F 12/00
(52) U.S. Cl. ....................... 711/202; 711/147; 713/1; 365/568
(58) Field of Search ............................... 711/147, 148, 711/165, 209, 202, 5; 713/1, 2; 365/568

(56) References Cited

U.S. PATENT DOCUMENTS

| | | | |
|---|---|---|---|
| 5,737,769 A | * | 4/1998 | Kim ............................ 711/202 |
| 5,878,248 A | | 3/1999 | Tehranian et al. |
| 5,953,746 A | | 9/1999 | Crocker et al. |
| 6,108,748 A | * | 8/2000 | Ofek et al. ................. 711/100 |
| 6,192,455 B1 | * | 2/2001 | Bogin et al. ................ 345/520 |

* cited by examiner

Primary Examiner—Matthew Kim
Assistant Examiner—Matthew D. Anderson
(74) Attorney, Agent, or Firm—Trop, Pruner & Hu, P.C.

(57) ABSTRACT

Redirection of accesses to non-existent memory is instead sent to a virtual buffer. The virtual buffer may be implemented in headless systems which include no video buffer. Console redirection may use the virtual buffer to display information about the headless system. Accesses to the non-existent video hardware, either directly or using the BIOS API, are redirected to the virtual buffer before being retrieved by a remote console. The headless system is cheaper and may support additional add-in cards because the system includes no video controller.

19 Claims, 5 Drawing Sheets

REDIRECTING MEMORY ACCESSES FOR HEADLESS SYSTEMS

BACKGROUND

This application relates to memory addressing and, more particularly, to performing console redirection where memory accesses are redirected.

A processor-based system connected to a computer network may communicate with other entities on the network. Because of the proliferation of networks, a computer in an office down the hall, a server in another city, or an e-mail recipient in another country may be accessible to the processor-based system.

Managing a network of computers typically involves sophisticated software and highly trained individuals. Further, because some entities on the network may physically be remote to a central site, remote management of network entities is increasingly featured in network management software.

Console redirection is one scheme for addressing remote management. Console redirection allows a user, such as a network administrator, to both control and retrieve status information about a system that physically resides in a location remote to the user, e.g. a managed system. For example, during console redirection, keystrokes entered on a user computer system may be received by the managed system. In this manner, the remote key entry operates as if the keys had been entered on the keyboard of the managed system. Software running on the user system, the managed system, or both, may likewise cause data intended for the managed system to be redirected to the user computer system, such as to a display. The user system may thus interact and observe operation of the managed system. Console redirection may be performed over a number of physical media, including a standard telephone line, a local-area network (LAN) line, a wide-area network (WAN) line, wireless media, and so on.

Often, processor-based systems may be configured as "headless." In headless systems, no keyboard or video monitor is connected to the system. Thus, the system may only be accessed from a remote terminal. Headless systems, such as servers, may be preferred by Internet service providers (ISPs), for example, because more servers may be packed into a given space.

In one implementation of console redirection, software periodically scans the video buffer of the managed system for activity. Where changes to the video buffer of the managed system are identified, the updates are sent, or redirected, to the video buffer of the user computer system. For headless systems, this method of console redirection works because the video buffer, although not the video display, remains present in the headless system.

Because the video display is not used in the headless system, it would be highly desirable to remove the associated video hardware as well. For example, a video subsystem may typically include a video graphics adapter (VGA) controller, input/output (I/O) registers, and a portion of memory to be used as the video buffer. In addition to providing cost savings, removing VGA hardware further enables other cards to be added to the headless system in place of the video controller. However, without a video buffer, the aforementioned console redirection scheme would not be implemented.

Thus, there is a continuing need to redirect memory accesses where no video buffer is available and to provide console redirection for such systems.

DETAILED DESCRIPTION

In accordance with the several embodiments described herein, a system and method for remotely controlling headless systems, where the headless system includes no video buffer, is disclosed. In some embodiments, the firmware of the headless system includes modifications which intercept or redirect accesses intended for the absent video buffer. A virtual video buffer is allocated in the headless system which may then be may be sent to a console which is remote to the headless system, using a known console redirection scheme, according to one embodiment. The console redirection may thus be performed on the headless system without any video buffer being present. Thus, any VGA controllers on the headless system may be removed, yet console redirection may still be performed.

Figure 1:
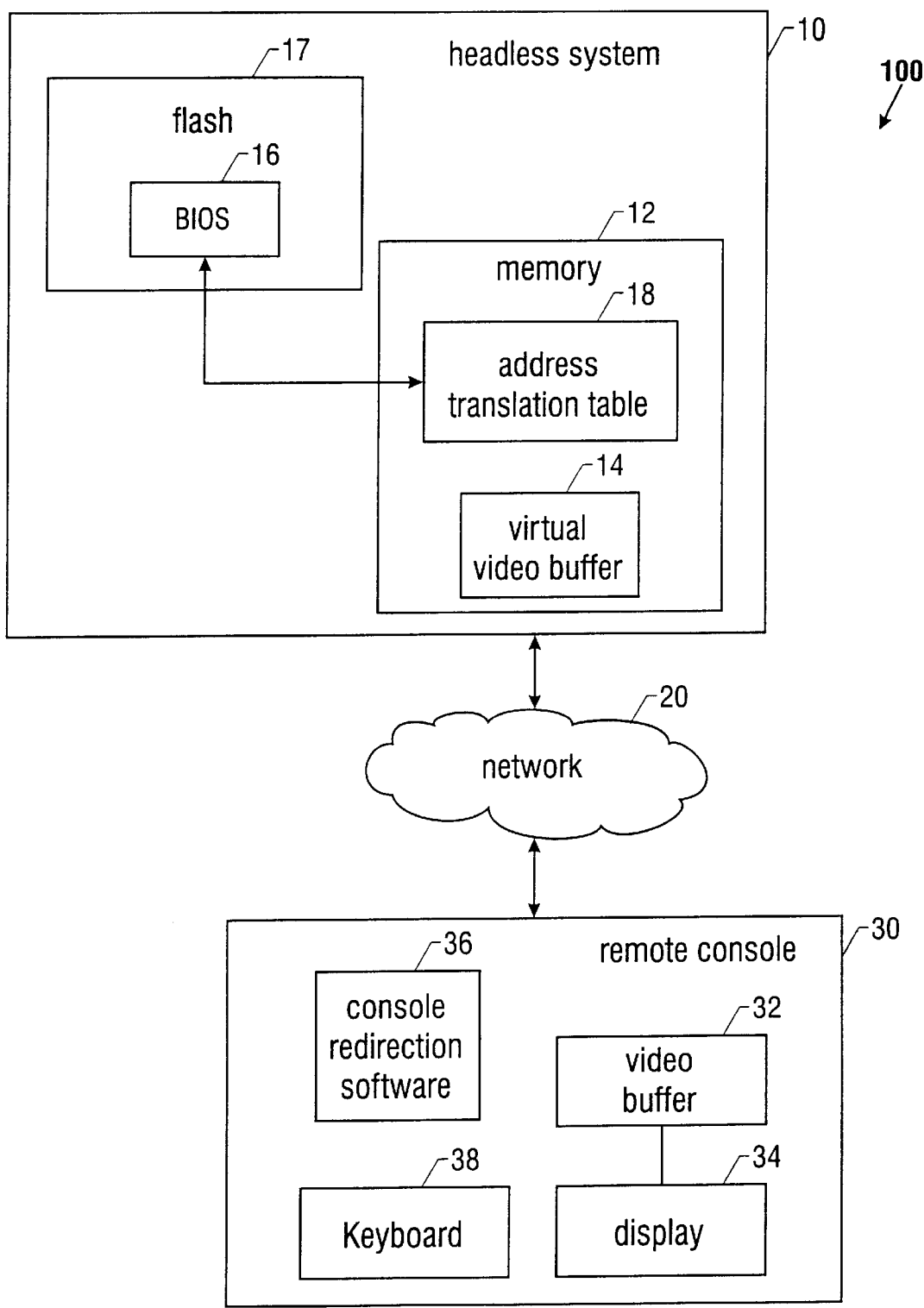
FIG. 1 is a block diagram of a system according to one embodiment of the invention.

In FIG. 1, a system 100 includes a headless system 10 and a remote console 30, coupled to a network 20. As used herein, the term "remote," used to describe the console 30, is defined relative to the headless system 10. "Remote" identifies that the console 30 is not directly connected to the headless system 10. Likewise, the headless system 10 is remote to the console 30.

In one embodiment, the headless system 10 is a processor-based system including a storage location 12, such as a memory, and a basic input/output system (BIOS) 16. The memory 12 may include a random access memory, such as dynamic random access memory (DRAM), synchronous DRAMs (SDRAMs), and static RAMs (SRAMs).

The BIOS 16 is a firmware program. The BIOS 16 commonly resides in a read-only memory (ROM) or a flash device. In the embodiment of FIG. 1, the BIOS 16 is stored in a flash memory 17. Alternatively, the BIOS 16 may be stored in other non-volatile memory devices, such as erasable and programmable read-only memories (EPROMS) or electrically erasable and programmable read-only memories (EEPROMS).

Typically, the BIOS 16 performs initialization of the components of the processor-based system. Further, the BIOS 16 typically includes functions or application programming interfaces (APIs), which enable other software loaded on the processor-based system to access hardware devices of the system.

Under the personal computer/advanced technology (PC/AT) architecture, the BIOS includes a group of software interrupts (APIs) for communication with the PC/AT hardware. For example, to communicate with the floppy or hard disk drives, a software program may issue an "Int 13h" function. A number of Int 13h functions may be invoked for interacting with the drive. Functions exist for reading from, writing to, resetting, and formatting a disk, for example. Likewise, the BIOS for PC/AT systems typically includes an Int 10h API for communicating with the video subsystem. It is the Int 10h API which is of interest to the system 100.

In FIG. 1, the headless system 10 may communicate with the remote console 30 across the network 20. The network may be a local-area network (LAN), a wide-area network (WAN), on the Internet, and so on. Accordingly, both the headless system 10 and the remote console 30 include the capability to be connected to the network 20. Both the remote console 30 and the headless system 10 may feature a network interface card, or a modem, (not shown), as examples.

The remote console 30 includes a video buffer 32, a portion of which is known as "screen memory," and a display 34. The video buffer 32 holds data that is to appear on the display 34. While in console redirection mode, the video buffer 32 and the display 34 thus act as the "head" of the headless system 10.

The remote console 30 further includes console redirection software 36 for retrieving data from the headless system 10 and sending the data to the display 34.

In the system 100 of FIG. 1, the headless system 10 may not include a physical video buffer. Accordingly, in one embodiment, a virtual video buffer 14 is allocated in the memory 12. In the embodiment of FIG. 1, for example, the BIOS 16 identifies a portion of the memory 12 as the virtual video buffer 14. The console redirection software 36 running in the remote console 30 may retrieve the data stored in the virtual video buffer 14 from the headless system 10 and store the data in its own video buffer 32, to ultimately be received by the display 34. A user or administrator at the remote console 30 may thus view configuration, diagnostic, or other information pertaining to the headless system 10.

Where the BIOS 16 is the only program executing on the headless system 10, all reads, writes, or other video buffer accesses may be re-routed by the BIOS 16 to the virtual video buffer 14. The contents of the virtual video buffer 14 could then be transported across the network 20 to the video buffer 32 of the remote console 30.

However, the BIOS 16 may not be the only program running on the headless system 10. For example, the headless system 10 may also include an add-in card upon which an option ROM resides. Examples of such add-in cards include a small computer system interface (SCSI) controller, an enhanced video graphics controller, a game adapter card, and so on. During power-on of the headless system 10, any option ROMs which are identified by the BIOS 16 are executed.

Accordingly, the software contained on these option ROMs may attempt to write to or read from the non-existent screen memory of the headless system 10. In addition to option ROMs, the headless system 10 may include configuration utilities which may be executed during power-on. Or, an operating system may be loaded and run on the headless system 10. Once the operating system is loaded, other software programs may be loaded and run on the headless system 10.

When the operating system is running, screen outputs are typically handled through an API defined by the operating system. If an operating system, running on the headless system 10, determines that no video buffer exists, for example, the operating system may load a "dummy" VGA driver that redirects screen outputs, originally intended for the headless system 10, to the video buffer 32 of the remote console 30.

Before the operating system is loaded and run, however, the programs running on the headless system 10 may either access the video hardware directly or may use the BIOS API, such as Int 10h. Thus, according to one embodiment, the system 100 addresses both software which invokes direct accesses to the video hardware as well as software that utilizes the BIOS API.

Figure 2:
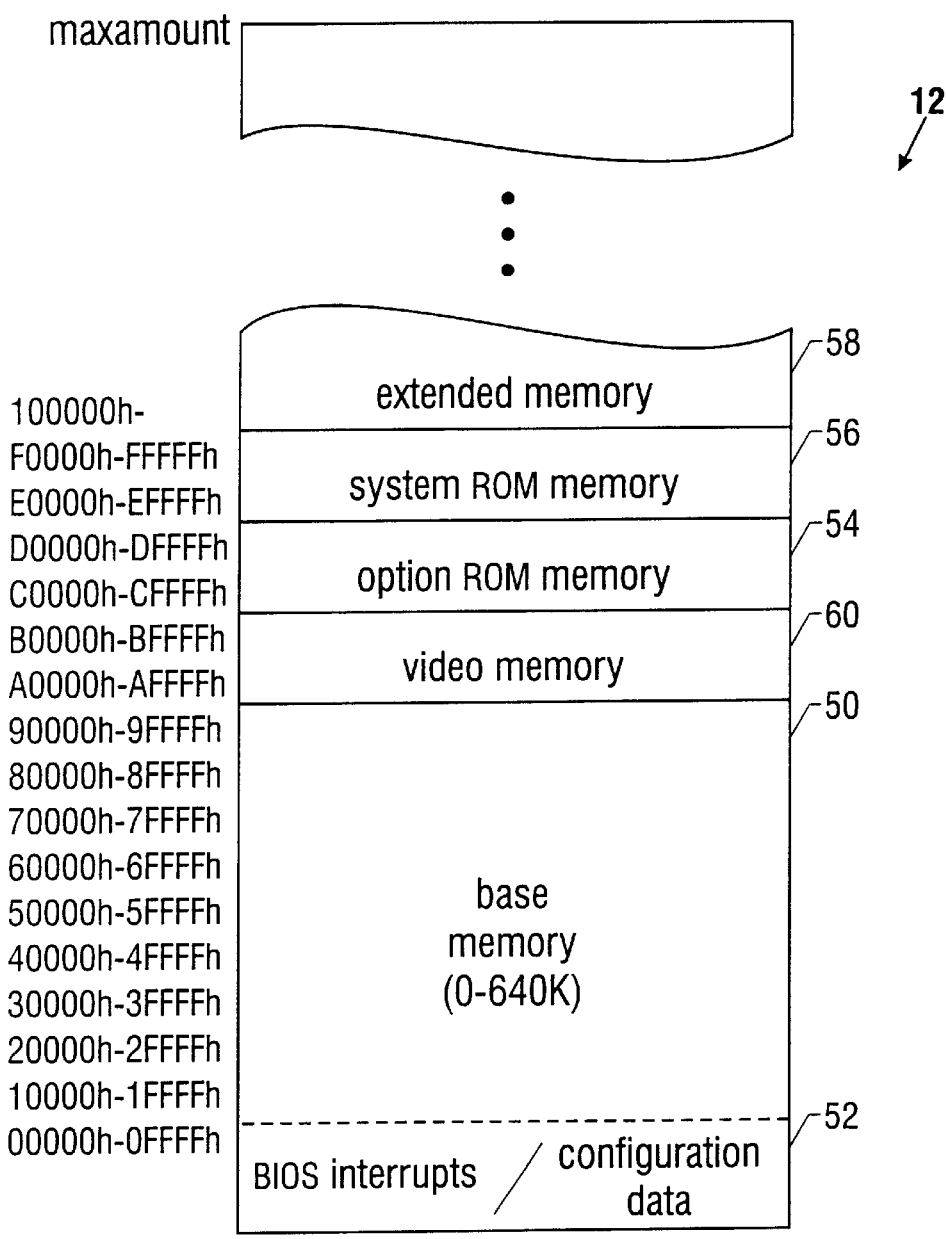
FIG. 2 is a diagram illustrating memory mapping according to one embodiment of the invention.

In FIG. 2, an address map of the memory 12 is illustrated according to the PC/AT architecture. The first 640K of the memory 12 is called the base memory 50. Addressing for the base memory 50 is shown as ten 64K units, according to one embodiment. In the PC/AT architecture, for example, the bottom 64K (unit 52) is reserved to store addresses for BIOS interrupts, as well as to store configuration information.

Immediately following the base memory portion 50, a video memory portion 60 is addressed from A0000h through BFFFFh. Some portion of the video memory 60 is allocated for the video buffer or screen memory. Depending on the configuration, a processor-based system typically includes 32k, 64k, or 128k of video memory 60. Typically, the screen memory is addressed from address B8000h through BFFFFh.

Adjacent to the video memory 60, a 128K portion of the memory 12 is addressed as option ROM memory 54. Likewise, a portion of the memory 12 is addressed as system ROM memory 56. Typically, the BIOS 16 is part of the system ROM memory 56. Memory addressed above one megabyte is known as extended memory 58. The extended memory 58 comprises all the remaining memory in the system.

In one embodiment, the BIOS 16 allocates a portion of the memory 12 as the virtual video buffer 14. The virtual video buffer 14 may be addressed as part of the base memory 50 or the extended memory 58. Alternatively, any unused system ROM address space 56 or option ROM address space 54 may be assigned as the virtual video buffer 14 by the BIOS 16.

Where programs running on the headless system 10 access a non-existent video buffer by invoking the Int 10h function or other API, the BIOS 16, according to one embodiment, routes such accesses to the virtual video buffer 14. Operation of the BIOS 16, according to one embodiment, is depicted in the flow diagram of FIG. 3.

According to the PC/AT architecture, the video subsystem may operate in one of several different video modes. The selection of a video mode affects how the contents of the video buffer, in this case, the virtual video buffer 14, are displayed. Accordingly, in one embodiment, the BIOS 16 selects video mode three for all accesses to the virtual video buffer 14. Video mode three may be set by invoking an Int 10h function call in the BIOS 16 during initialization.

In one embodiment, the BIOS 16 allocates a portion of the memory 12 as the virtual video buffer 14, as depicted in FIG. 1 (block 202). In one embodiment, the size of the virtual video buffer 14 is determined by calculating the number of bytes needed to store display information. For example, in video mode three, a screen has eighty columns and twenty-five rows, and two bytes per page are used. Thus, a virtual video buffer 14 of at least 4000 bytes may adequately store data intended for display, e.g., act as the screen memory of the headless system 10.

The virtual video buffer 14 is then initialized (block 204). In one embodiment, all entries of the virtual video buffer 14 are initialized by the BIOS 16 as "blank." The BIOS 16 also retrieves video configuration parameters (block 206). In FIG. 2, configuration information about the headless system 10 is stored in the first 64K block 52 of the system memory 12. (In PC/AT systems, for example, the configuration information is addressed at 40:XX.)

Configuration parameters pertaining to the video subsystem are likewise stored in the configuration data block 52. Such parameters may include cursor size, cursor position, page number and so on. Once the BIOS 16 retrieves the video configuration parameters, the BIOS 16 updates the virtual video buffer 14 with these configuration parameters in mind (block 208).

During initialization, the BIOS 16 may execute an option ROM program, a configuration utility, or other software prior to handing control to an operating system. The BIOS 16 may monitor accesses to the video API, such as the invocation of an Int 10h function, by the software programs (diamond 210). If the BIOS API is invoked, the BIOS 16 may intercept the call and execute a substitute API call in which the virtual video buffer 14, rather than the non-existent video buffer is accessed (block 212). Relevant video configuration parameters, such as cursor position, page number, and so on, may also be updated (block 214).

In one embodiment, the BIOS 16 ignores API requests which are unserviceable. Examples include calls to change the video mode, draw pixels on the screen, and update the font table, to name a few.

Looking back to FIG. 1, the console redirection software 36 of the remote console 30 may retrieve the contents of the virtual video buffer 14 of the headless system 10. The contents may then be stored in the video buffer 32 of the remote console 30, for presentation to the display 34. In this manner, any information intended to be displayed by software running on the headless system 10 is instead viewable from the display 34 of the remote console 30. Additionally, entries into the keyboard 38 of the remote console 30 may be received by the headless system 10 as if entered by a keyboard connected to the server 10.

Thus, upon receiving a screen of information relating to the headless system 10 on the display 34, a user at the remote console 30 may respond to the screen information using the keyboard 38. These keystrokes may then be received by the headless system 10, according to previously known implementations of console redirection. The system 100 thus provides a fully interactive mechanism for communicating remotely with the headless system 10.

Figure 3:
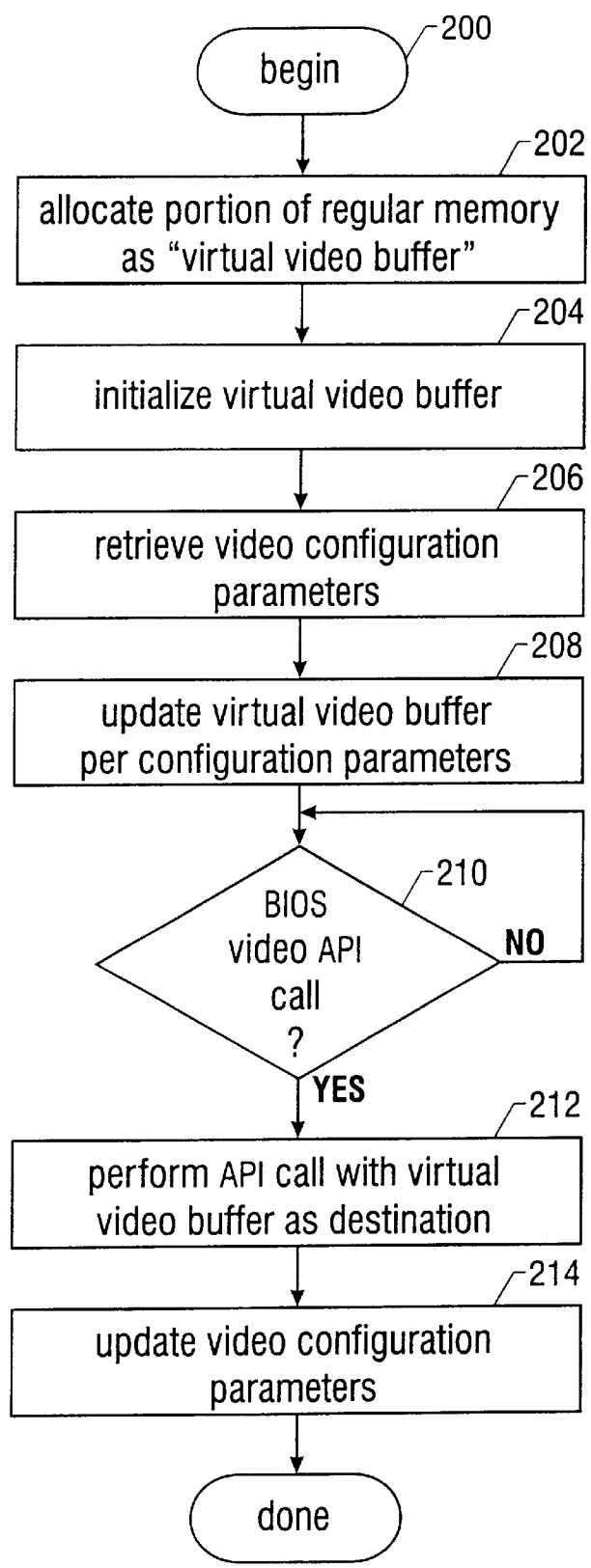
FIG. 3 is a flow diagram illustrating operation of the BIOS of FIG. 1 according to one embodiment of the invention.

In FIG. 3, the BIOS 16 enables accesses to the non-existent video buffer which invoke the BIOS API (Int 10h function) to be re-routed to the virtual video buffer 14 in the memory 12. However, some software programs access video memory directly. For such programs, additional safeguards are needed.

For example, the BIOS video API (Int 10h) includes a function OEh called "write a character." As input parameters, the function receives the ASCII code of the character to be written and the foreground color of the character. Upon invocation, a character is written to the current location of the cursor in the current screen page. (Both the current location of the cursor and the current screen page are stored in the configuration data portion of the memory (unit 52 of FIG. 2).

Where the function is invoked by software, the BIOS 16 adequately re-routes accesses to the non-existent video buffer, as described above. However, instead of invoking an Int 10h, function OEh, to write a character to a particular location on the screen, the software may write directly to the video memory block 60 (see FIG. 2). During such occurrences, the modified BIOS 16 described in FIG. 3 is ineffective.

Thus, according to one embodiment, the BIOS 16 may configure the hardware of the headless system 10 to "map" the standard video memory to some other location. In other words, addresses A0000h through BFFFFFh may be mapped to the memory 12 instead of to the non-existent video hardware.

In FIG. 1, the BIOS 16 is coupled to an address translation table 18, stored in the memory 12. In one embodiment, the address translation table 18 includes entries for mapping each portion of the memory 12. During initialization of the headless system 10, the BIOS 16 retrieves the address translation table 18. Using the address translation table 18, the BIOS 16 may map all the memory 12 of the headless system 10.

In one embodiment, the entries in the address translation table 18 use identity mapping (input address and output address are the same) for all memory mapping except for the video buffer region. To support both accesses to the video buffer region using the API and non-API, or direct, accesses to the video buffer region (A0000h–BFFFFh), the address translation table 18 maps two address regions to the virtual video buffer 16.

Figure 4:
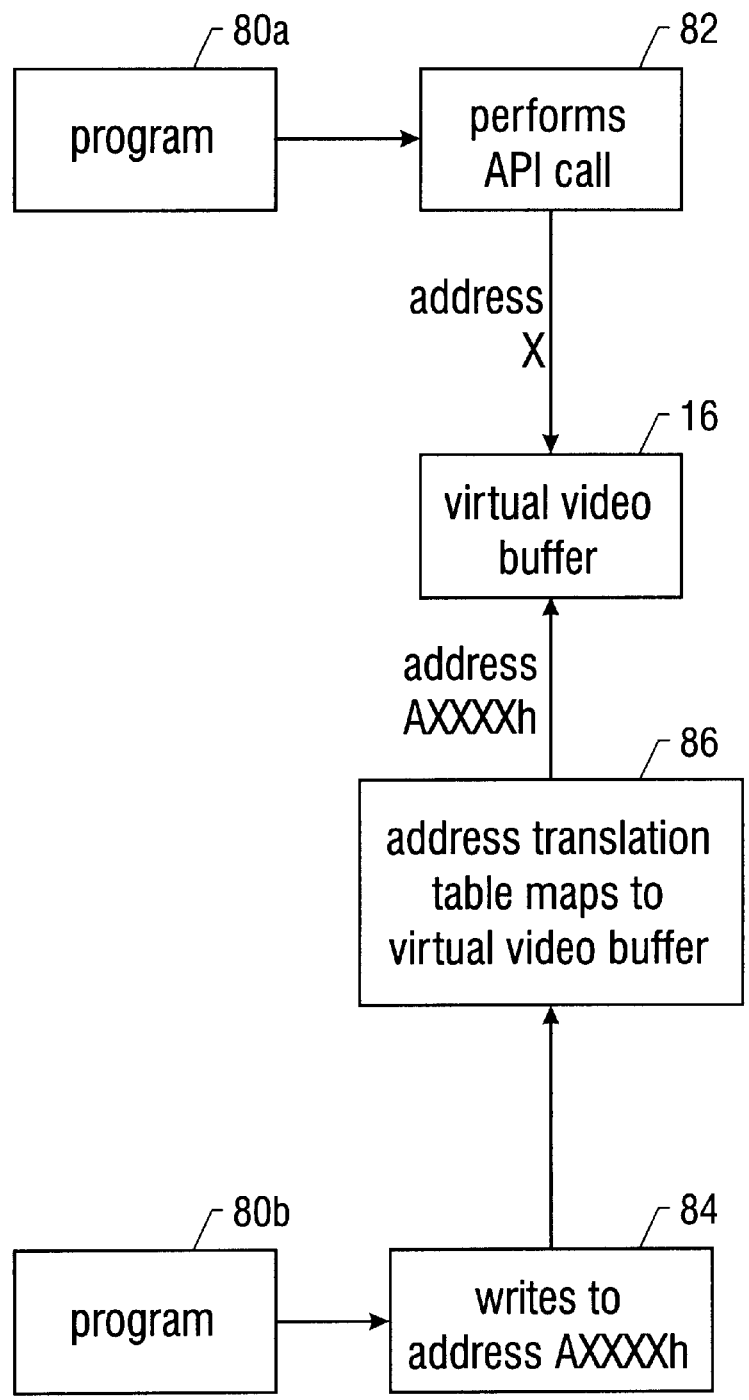
FIG. 4 is a block diagram illustrating how the virtual video buffer may be addressed according to one embodiment of the invention.

The dual addressing of the virtual video buffer 16 is illustrated in FIG. 4. A program 80*a* may perform an API call (block 82) to access the non-existent video buffer. The API, such as an INT 10h function or other interrupt, knows to address the virtual video buffer 16 at some address besides the video buffer region, A0000h–BFFFFh, shown as address X.

A second program 80*b* addresses the non-existent video buffer directly, such as writing to address AXXXXh (block 84). The address translation table 18 maps the video buffer region, A0000h–BFFFFh, to the virtual video buffer 16, which may be a part of regular memory, for example. The virtual video buffer 16, addressed using two different addresses, is nevertheless properly accessed by programs 80*a* and 80*b*.

When the software, such as a program stored in an option ROM or a configuration utility, writes to the non-existent video buffer, the hardware redirects those writes to another address. In one embodiment, the address that the data is redirected to is the address where the virtual video buffer 14 is located. In another embodiment, a distinct virtual video buffer is used. Thus, one virtual video buffer 14 is used for software which invokes API calls while a second virtual video buffer is used for software which accesses the video memory 60 directly.

Figure 5:
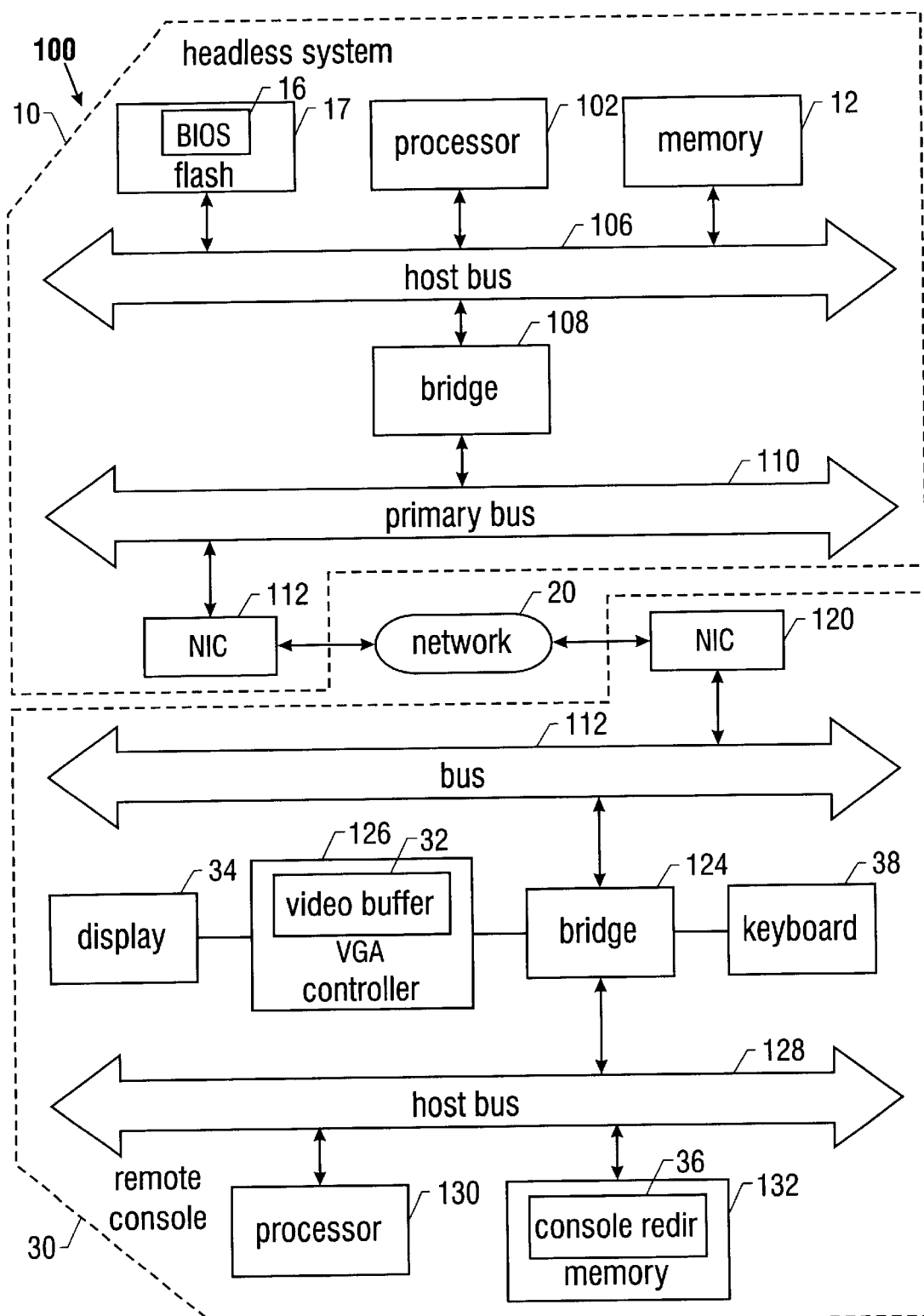
FIG. 5 is a block diagram of the system according to one embodiment of the invention.

In FIG. 5, a block diagram illustrates a configuration of the system 100 according to one embodiment. As in FIG. 1, the headless server 10 and the remote console 30 are coupled to one another by the network 20.

The headless system 10 includes a processor 102 and the memory 12 connected by a host bus 106. The processor 102 may be a microprocessor, a microcontroller, or any suitable control device. The memory 12 may be a static random access memory (SRAM), dynamic RAM (DRAM), or other volatile medium for storing data and programs during operation of the system 10.

Also coupled to the host bus 106 is a bridge 108, for connecting to a second bus 110. The host bus 106 further connects to a flash memory 17, upon which the BIOS 16 is loaded. Alternatively, the flash memory 17 may be coupled to the bridge 108.

The headless system 10 is connected to the network 20 using a network interface card (NIC) 112. Alternatively, the network 20 may be accessed using a modem (not shown) or a wireless connection may be established.

On the remote console 30, a processor 130 and a memory 132 are also coupled to a host bus 128. The memory may store the console redirection software 36, for accessing the headless system 10. A bridge 124 connects the host bus 128 to a second bus 122. The remote console 30 includes a NIC 120, for connection to the network 20.

In one embodiment, the bridge 124 is a multi-function device which may support the keyboard 38, a video controller 126 such as a VGA controller, upon which the video buffer 32 resides. The VGA controller 126 is connected to the display 34, upon which information about the headless system 10, according to the embodiments described above, may be viewed.

Thus, according to the embodiments described herein, console redirection may be performed to access a remote, headless system which includes no video buffer. The headless system is cheaper and may support additional add-in cards by eliminating the video controller. Accesses to the non-existent video hardware, either directly or using the BIOS API, are redirected to a virtual video buffer before being retrieved by the remote console.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system without a display comprising:
    a storage location comprising a virtual buffer; and
    a program that, upon execution:
        determines whether or not a request to access an address is mapped to the storage location; and
        if the address is not mapped to the storage location, redirects the request to the virtual buffer for display on a second system.

2. The system of claim 1, further comprising a processor, wherein the program is executed by the processor when the system is powered on.

3. The system of claim 2, wherein the program is a basic input output system program.

4. The system of claim 2, the second system comprising:
    a display; and
    a program that, upon execution:
        identifies the system;
        retrieves data stored in the virtual buffer from the system; and
        sends the data to the display.

5. The system of claim 4, wherein the second system is connected to the system by a network.

6. A system comprising:
    a connection to a headless system comprising a virtual buffer; and
    a program that, upon execution:
        identifies the headless system;
        retrieves data stored in the virtual buffer; and
        sends the data to a display.

7. The system of claim 6, wherein the headless system includes no video buffer.

8. The system of claim 7, wherein the headless system is connected to the system by a network.

9. A method comprising:
    receiving a request to access a first storage location in a headless processor-based system;
    accessing a second virtual storage location in place of the first storage location;
    sending data for display from the second virtual storage location to a second processor-based system.

10. The method of claim 9, further comprising:
    sending the data to a display on the second processor-based system.

11. The method of claim 9, receiving a request to access a first storage location in a headless processor-based system further comprising:
    receiving an address of a memory; and
    identifying no portion of the memory that is mapped to the address.

12. A method for a first processor-based system comprising:
    monitoring activity on a second headless processor-based system; and
    retrieving data from a virtual storage location on the second headless processor-based system for display on the first processor-based system.

13. The method of claim 12, monitoring activity on the second headless processor-based system further comprising monitoring writes to the storage location.

14. The method of claim 12, further comprising:
    sending the data to a display on the first processor-based system.

15. An article comprising a medium storing a software program that, upon execution, enables a headless processor-based system to:
    receive a request to access a first storage location in the headless processor-based system;
    access a second virtual storage location; and
    send data for display from the second virtual storage location to a second processor-based system.

16. The article of claim 15, further storing a software program that, upon execution, enables a headless processor-based system to:
    send the data to a display on the second processor-based system.

17. The article of claim 15, further storing a software program that, upon execution, enables a headless processor-based system to:
    receive an address of a memory; and
    identify no portion of the memory that is mapped to the address.

18. An article comprising a medium storing a software program that, upon execution, enables a first processor-based system to:
    monitor activity on a second headless processor-based system; and
    retrieve data from a virtual storage location on the second headless processor-based system for display on the first processor-based system.

19. The article of claim 18, further storing a software program that, upon execution, enables a first headless processor-based system to send the data to a display.

\* \* \* \* \*